Figure 1:
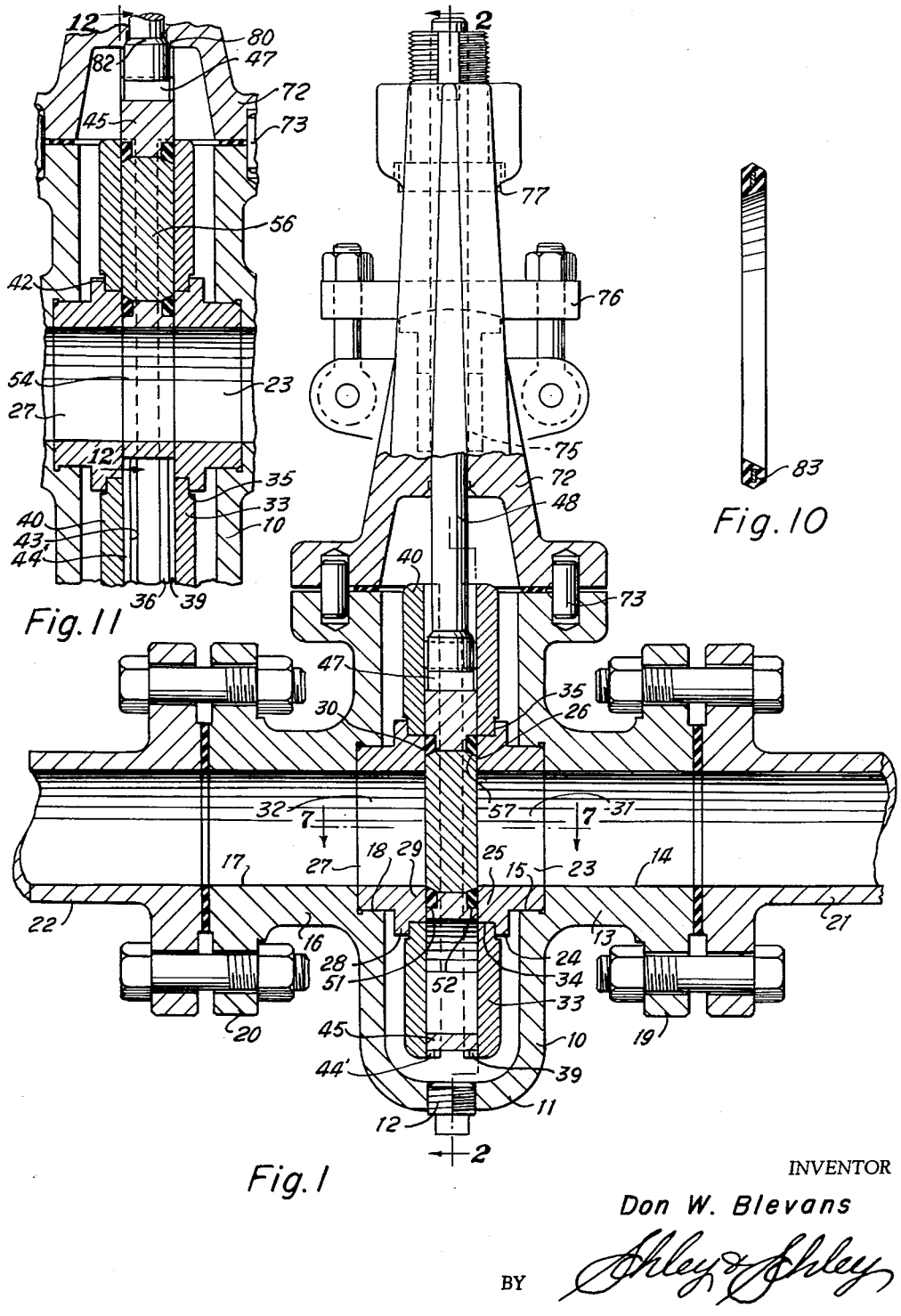

INVENTOR
Don W. Blevans
BY Ashley & Ashley
ATTORNEYS

INVENTOR
Don W. Blevans
BY Ahley & Ahley
ATTORNEYS

United States Patent Office 3,039,734
Patented June 19, 1962

3,039,734
GATE VALVES
Don W. Blevans, Tulsa, Okla., assignor to Orbit Valve
Company, Tulsa, Okla., a corporation of Oklahoma
Filed Feb. 23, 1960, Ser. No. 10,178
14 Claims. (Cl. 251—200)

This invention relates to new and useful improvements in gate valves.

It has long been a problem to provide a gate valve adapted for use under high pressure conditions which would effectively seal against high pressure from either the inlet port or the outlet port of the valve or which is not susceptible to malfunctioning due to varying temperature conditions, variations in the type or corrosiveness of the fluid being handled, and damage to the valve or the sealing means therefor just as the valve is beginning to open or in the terminal stage of the valve closing operation. It is known to be desirable to utilize a metal-to-metal seal throughout the valve, but such sealing faces are subject to damage due to the abrading thereof, due to wire-drawing, or due to the enlodgement of particles of foreign material between the sealing surfaces. In some valves, a heavy and viscous lubricant is utilized as an internal packing for the valve to supplement and to render more effective the metal-to-metal seals, but such lubricants obviously have a tendency to accumulate an appreciable content of foreign material, which may be quite hard in nature, to be subject to changes in properties due to temperature variations, or to be diluted or flushed out of the valve due to the passage of various liquids therethrough. There are various synthetic resins and elastomers known to be quite effective as sealing materials and to be highly resistant to temperature changes as well as variations in the nature of fluids to which they are exposed, but the utilization of such materials in valves has posed a problem due to the difficulty of retaining the sealing element in position under high pressure differentials as well as preventing the physical erosion or abrading of the sealing elements due to the flow of fluids thereover.

It is therefore, a principal object of this invention to provide an improved gate valve utilizing a metal-to-metal primary closure coupled with secondary sealing elements which may be formed of non-metallic materials such as synthetic resins and elastomers with unique provisions for the flexing or forcing of the sealing elements into sealing positions.

Yet another object of the invention is to provide an improved valve of the character described which is equally resistant to pressure applied either through its inlet port or its outlet port, and in which the sealing elements are protected from abrasion or dislodgement during the opening and closing operations.

A still further object of the invention is to provide an improved gate valve of the character described utilizing a primary metal-to-metal closure which is maintained at all times in such relative position as to prevent large foreign particles, which might be passing through the valve, from entering into the valve body or into the mechanism therein, and primarily from entering between the sealing elements and the surfaces against which they seal.

A further object of the invention is to provide an improved gate valve utilizing sealing elements in conjunction with a primary metal-to-metal closure, the sealing elements being flexed or forced into sealing position only after the valve is in the closed position, whereby undue wear and abrasion on the sealing elements during the opening and closing operations is avoided.

Still another object of the invention is to provide an improved gate valve having sealing rings for effectively closing off in completely pressure-tight relationship the spaces between the valve faces and the valve core, and in which means is provided for applying pressure equally and simultaneously to all portions of the rings for equal and simultaneous flexing or moving of the rings into sealing position.

Another object of the invention is to provide an improved gate valve utilizing sealing rings substantially surrounding the beveled ends of a valve core, and in which the rings are caused to flex or move outwardly over the beveled ends of the cores into sealing position whereby cold flowing of the sealing rings is avoided and only deflection or flexure thereof is required.

Yet another object of the invention is to provide an improved gate valve in which sealing rings are carried by the valve gate and are locked thereto so as to eliminate accidental extruding or forcing of the rings from the gate.

A still further object of the invention is to provide an improved gate valve adapted to utilize non-metallic sealing rings or sealing rings formed of a synthetic resin or an elastomer, the valve being so arranged that only minimum deflection or movement of the sealing rings is required, and wherein the sealing rings may, if desired, be provided with metallic cores for greater resistance against extrusion or displacement.

A construction designed to carry out the invention will be hereinafter described, together with other features of the invention.

Figure 2:
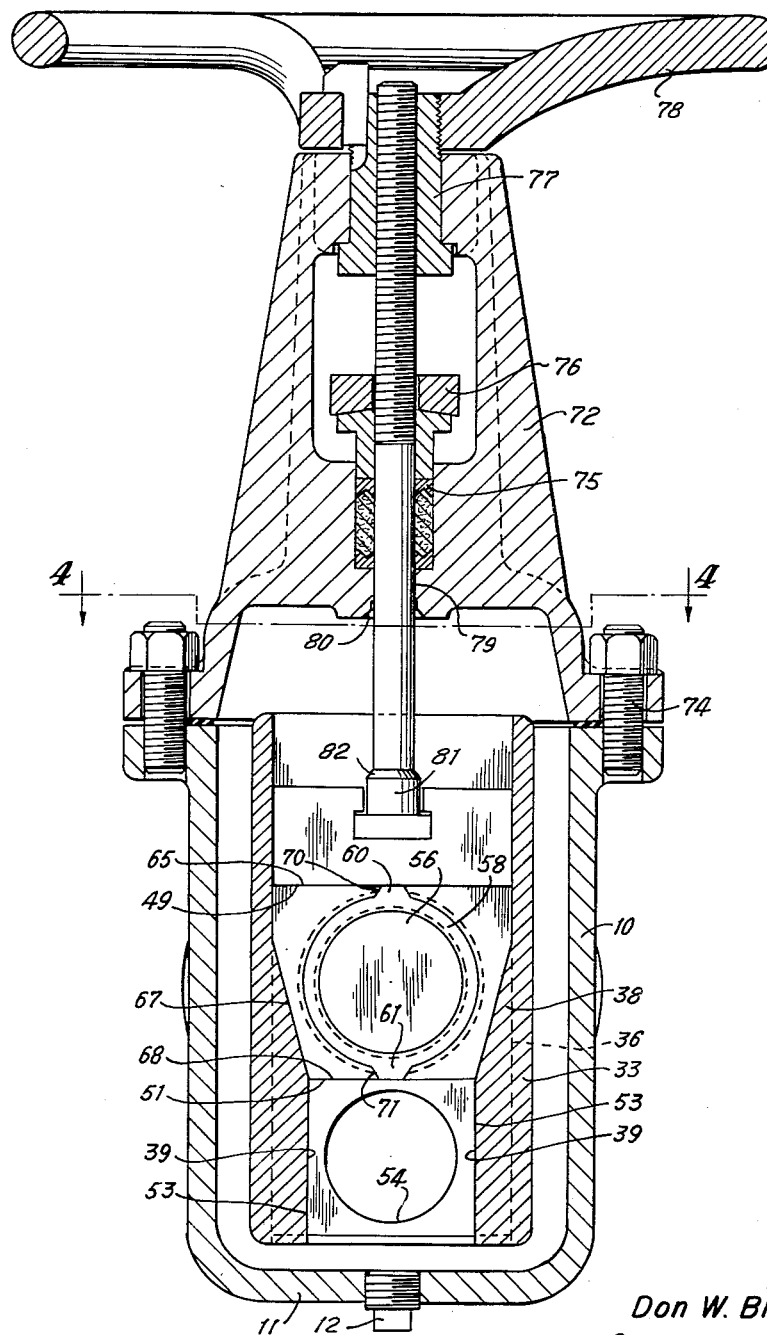
Figure 3:
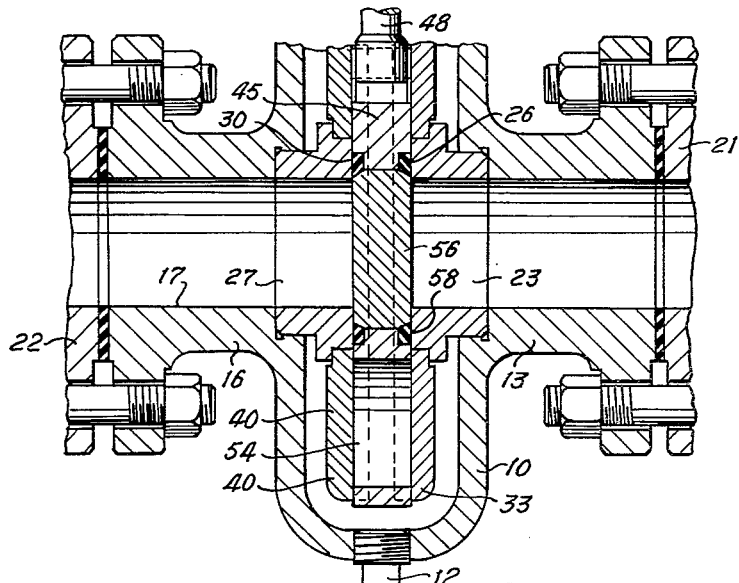
Figure 4:
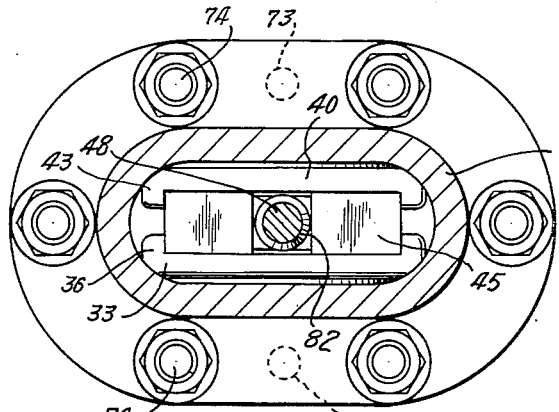
Figure 5:
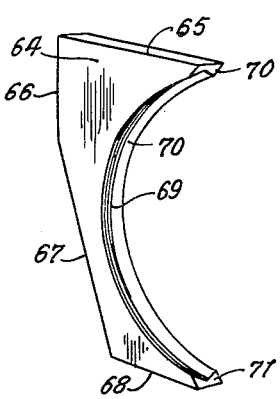
Figure 6:
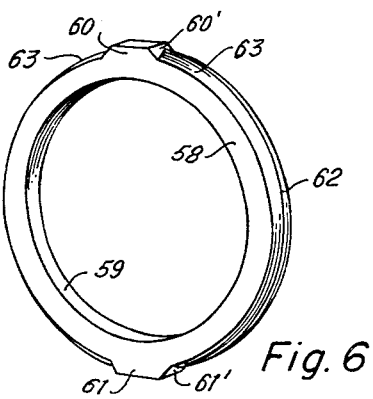
Figure 7:
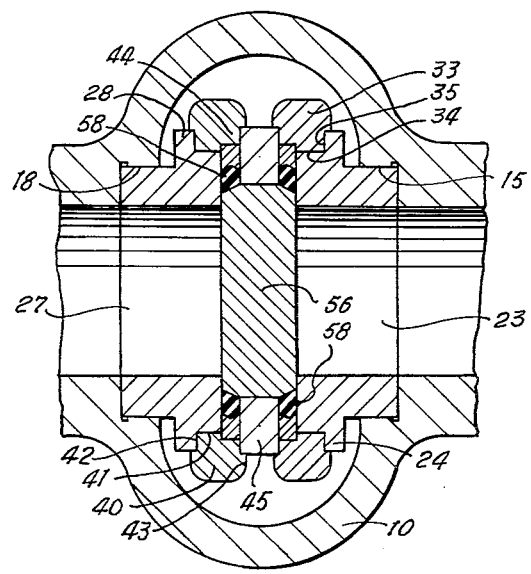
Figure 8:
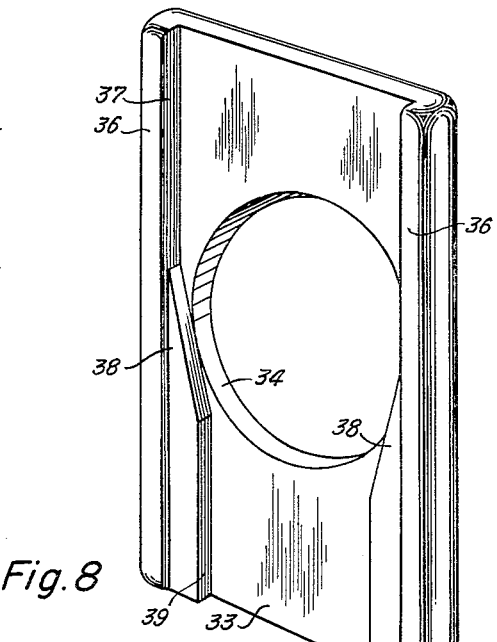
Figure 9:
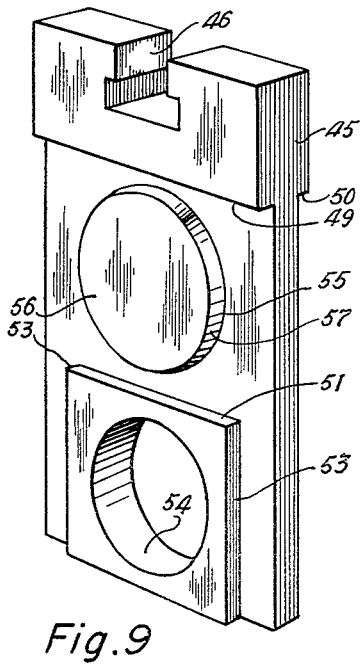
Figure 12:
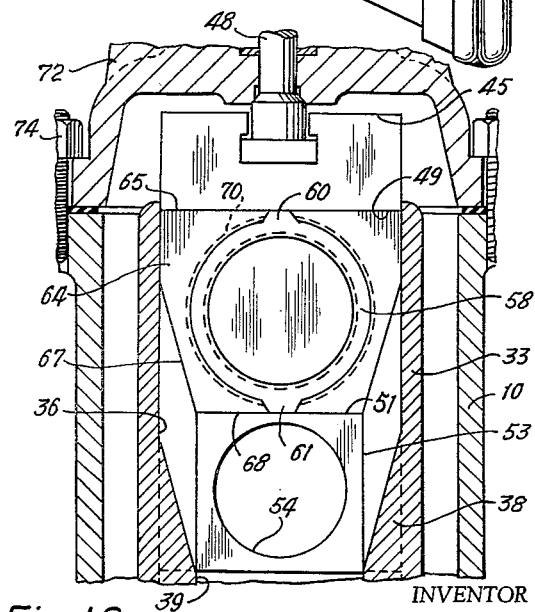

The invention will be more readily understood from a reading of the following specification and by reference to the accompanying drawings, wherein examples of the invention are shown, and wherein:

FIG. 1 is a vertical, sectional view of a gate valve constructed in accordance with this invention and showing the valve in a closed position with the valve wheel removed, FIG. 2 is a vertical, sectional view of the gate valve taken at right angles to FIG. 1 and upon the line 2—2 thereof, FIG. 3 is a vertical, sectional view of the lower portion of the valve, similar to FIG. 1, and showing the valve in the closed position that would occur after wearing of the sealing rings, FIG. 4 is a horizontal, cross-sectional view taken upon the line 4—4 of FIG. 2, FIG. 5 is a view in perspective of one of the wedge elements for flexing the sealing ring, FIG. 6 is a view in perspective of one of the sealing rings, FIG. 7 is a horizontal, cross-sectional view taken upon the line 7—7 of FIG. 1, FIG. 8 is a view in perspective of one of the wedge plates, FIG. 9 is a view in perspective of the valve gate, FIG. 10 is an enlarged, cross-sectional view of a modified form of the sealing ring, FIG. 11 is a fragmentary, vertical, sectional view of the lower portion of the valve showing the valve in an open position, and FIG. 12 is a view similar to FIG. 11 but taken at right angles on line 12—12 of FIG. 11.

In the drawings, the numeral 10 designates a hollow gate valve housing or body of generally oblong cross-section and having a closed bottom 11 carrying a removable drain plug 12. A flanged inlet collar 13 is formed integrally of the body 10 and has its axial inlet passage 14 opening into the interior of the body 10 through a counterbore 15 cut in the inner surface of one major side wall of the body 10. A flanged outlet collar 16 is formed integrally of the opposite major side wall of the body 10 and has its axial bore 17 opening into the interior of the body 10 through a counterbore 18, substantially identical to the counterbore 15, and cut in the inner wall of the valve body. The passages 14 and 17, along with the counterbores 15 and 18 are in axial alinement with one another as is the customary practice in this type of valve. The collars 13 and 16 are, of course, provided with flanges 19 and 20, respectively, for receiving the flanged ends of inlet and outlet conductors 21 and 22, respectively.

A seat ring 23 has a snug press fit in the counterbore 15 and projects inwardly from the counterbore into the interior of the valve body, the ring being formed with an external, outwardly-directed flange 24 spaced from the inner side wall of the valve body 10, the portion 25 of the ring 23 inwardly of the flange 24 being of greater external diameter than the portion of the ring received in the counterbore 15 and carrying an annular valve face 26 on its inner end. Similarly, a seat ring 27 has a snug press fit within the counterbore 18 and carries an external flange 28 adjoining an enlarged inner portion 29 carrying an annular valve face 30. The bores 31 and 32 of the rings 23 and 27 aline with the bores 14 and 17 and with each other, the opposing valve faces 26 and 30 being spaced apart a predetermined distance, and desirably, being arranged vertically within the valve body 10 in parallel relationship. As will appear more fully hereinafter, it is important that the spacing and parallelism of the valve faces 26 and 30 be maintained within relatively critical tolerance limitations, and for this reason, the machining of the counterbores 15 and 18, along with that of the seat or valve face rings 23 and 27 is desirably kept within very close dimensional tolerances.

A somewhat rectangular, vertical cam plate 33 is formed with a circular, medial aperture 34 which receives the enlarged portion 25 of the seat ring 23 and which is surrounded on the outer face of the cam plate 33 with a counterbore 35 which receives the flange 24. The counterbore 35 is of such depth as to bring the inner face of the plate 33 into relatively exact alinement with the valve face 26 to present a substantially continuous surface on the inner side of the cam plate and the seat ring. The cam plate need not have a press fit on the inner end of the seat ring but only a snug sliding fit.

The cam plate, as shown in FIGS. 7 and 8, is provided with a pair of opposed, inwardly-projecting flanges 36, extending vertically of its lateral edges and presenting, smooth, continuous opposed bearing faces 37. Commencing slightly above the center of the opening 34, the cam plates are provided with wedge or cam elements 38 of less thickness than the flanges 36 and extending downwardly and inwardly toward the vertical axis of the cam plate to merge into vertical, opposed, bearing surfaces 39.

A second cam plate 40, substantially identical to the cam plate 33, is formed with a central aperture 41 receiving the enlarged inner portion 29 of the seat ring 27, and an outer counterbore 42 receiving the flange 28. The cam plate 40 is also formed with the lateral flanges 43 similar to the flanges 36, and the wedge or cam elements 44 similar to the elements 38. The cam elements 44 merge into the vertical shoulders 44'.

A rectangular valve gate 45 is slidably positioned between the cam plates 33 and 40, the valve gate 45 being of such thickness as to have a snug sliding fit between the inner faces of the cam plates and being of such width as to have a snug sliding fit between the lateral flanges 36 of the plate 33 and the lateral flanges 43 of the plate 40. A T-shaped notch 46 is cut in the upper end of the gate 45 and receives the T-shaped head 47 provided upon the lower end of a valve operating stem 48 extending upwardly from the gate. Below the notch 46, the gate has both sides cut away to form a transverse, horizontal, downwardly facing shoulder 49 on one side of the gate and a corresponding shoulder 50 on the opposite side thereof, the cut-away portions extending downwardly over the opposite faces of the gate to a point spaced from the lower end thereof to form horizontal, transverse, upwardly-directed shoulders 51 and 52, respectively. The faces of the valve gate are further cut away below the shoulders 51 and 52 and along its lateral edges to form opposed, laterally facing shoulders upon each face of the valve gate, one pair 53 of which is shown in FIG. 9. A passage 54, adapted to be brought into alinement with the passages 31 and 32 when the valve is in an open position, is cut through the lower portion of the valve gate between the shoulders 53 and below the shoulder 51. Between the shoulders 49 and 51, a circular opening 55 is cut through the valve gate and receives with a press fit a circular plug or valve core 56 of the same thickness as the spacings between the valve faces 26 and 30. The marginal portions or peripheries of each end of the core 56 which project outwardly from the cut away portions of the valve gate are bevelled or chamfered as shown at 57 in the dawings.

The valve gate is received in snug sliding engagement between the cam plates 33 and 40, the vertical shoulders 53 on each side of the gate engaging the vertical shoulders 39 and 44' while the outer vertical edges of the gate engage the inner faces of the flanges 36 and 43. Thus, as may clearly be seen by comparing FIGS. 8 and 9, the rectangular boss encircling the port 54 and bounded by the shoulders 51 and 53 fits snugly between the shoulders or vertical faces 39 of the cam plate 33 while the extreme outer edges of the gate slips snugly between the vertical guide faces 37.

A sealing ring 58, shown in FIG. 6, is formed with a tapered or bevelled inner periphery 59 having a snug and close fit over the beveled projecting portions 57 of the core 56, one of the rings 58 being provided upon each side of the valve gate and engaging over one of the projecting ends of the core 56. A lug 60 projects upwardly from the upper side of the ring 58 and has a flat upper surface abutting the underside of the shoulder 49, and a similar lug 61 extends downwardly from the lower side of the ring and has a flat underside abutting and adjoining the upper side of the shoulder 51. The lateral or end portions 60' and 61' of the lugs 60 and 61 are disposed at an angle and extend downwardly and outwardly from the upper face of the upper lug and upwardly and outwardly from the underside of the lower lug. The marginal portion 62 forming the outer periphery of the ring and extending between the lugs 60 and 61 is formed with a V-shaped rib 63 projecting outwardly of the sealing ring and extending entirely around the ring except for the areas occupied by the lugs 60 and 61. Thus it will be seen that one of the sealing rings 58 snugly engages the beveled periphery of each of the projecting ends of the core 56, that the upper lug 60 of each of the sealing rings abuts or adjoins the underside of the upper shoulders 49 and 50 while the undersides of the lower lugs 61 abut and adjoin the upwardly facing lower shoulders 51 and 52 thus securely locking the sealing rings in position and holding them against straight vertical movement either upwardly or downwardly.

For securing the sealing rings against lateral movement and making provision for their movement or deflection into sealing engagement with the sealing faces 26 and 30, a pair of wedge elements or ring-flexing elements 64 is provided for each of the sealing rings, one of the flexing elements being disposed on each side of the sealing ring and confined therearound within the upper cutaway portions of the valve gate between the flanges 36 or 43 of the cam plates. One of the flexing elements is shown in FIG. 5 and includes a flat plate-like element having a horizontal upper edge 65 adapted to engage the underside of either the shoulder 49 or 50 adjoined by a short vertical edge 66 which engages one of either of the flanges 36 or 43 and which merges into a downwardly inclined wedge or tapered portion 67 adapted to engage one of the wedge surfaces 38 or 44. The inclined surface 67 adjoins a flat horizontal bottom edge 68 for engaging the upper side of one of the shoulders 51 or 52, the upper and lower faces 65 and 68 of the flexing or deflecting elements being connected by an arcuate and inwardly-concave semi-circular section 69 having formed therein a V-shaped groove 70 complementary to the V-shaped ribs 63 of the sealing rings. The arcuate section 69 joins into the upper edge 65 through an inclined or beveled surface 70 complementary to one of the surfaces 60' of the upper lug 60 of the sealing rings, while the lower edge 68 is connected to the section 69 by an inclined surface 71 complementary to one of the inclined surfaces 61' of the lower lug 61. In this manner, when the sealing rings are positioned upon the projecting ends of the core 56 and the flexing elements 64 positioned on either side of the ring, both the sealing rings and the flexing elements are held against vertical movement, but the flexing elements are free to undergo limited horizontal movement. Now, when the assembled gate structure is slipped downwardly between the pair of cam plates 33 and 40, the shoulders 53 will move into snug sliding engagement with the shoulders or faces 39, the entire gate assembly will be held in snug sliding engagement with the flanges 36 and 43, and the two pairs of flexing elements 64 will likewise be engaged between the flanges 36 and 43. Therefore, the flexing elements are held against outward movement with respect to the sealing rings, and may only move inwardly with respect thereto to deflect or move the sealing rings outwardly over the chamfered edges 57 of the projecting end of the valve core 56.

The upper portion of the valve body 10 is closed by a bonnet 72 properly alined with the flanged upper end of the valve body by dowel pins 73 and secured thereto by stud bolts 74. The valve stem 48 extends upwardly through the bonnet 72 through a packing gland 75, adapted to be tightened by a transverse yoke 76, and into screw-threaded engagement with an operating sleeve 77 carrying a valve wheel 78. This is the usual rising-stem pipe of valve-operating mechanism, but a non-rising stem arrangement may obviously be used in place thereof or any other suitable arrangement for moving the valve gate upwardly and downwardly within the valve body.

In the particular type of operating mechanism illustrated in the drawings, the bonnet 72 is formed with an axial bore 79 below the packing gland 75 and which receives the valve stem 48 in sliding relationship, the lower end of the bore 79 being chamfered as shown at 80. The valve stem, immediately above the T-shaped head 47, is formed with an enlarged portion 81 having a chamfer 82 at the upper end thereof, the chamfer 82 engaging the chamfered portion 80 when the valve is in its fully open position so as to limit upward travel of the valve stem and the valve gate, as well as to seal off the valve body from the packing gland when the valve is open. The latter permits the packing in the gland 75 to be replaced with the valve body under pressure.

In the operation of the valve, and assuming the valve to be in an open position, as shown in FIGS. 11 and 12, the passage 54 of the valve gate will be in alinement with the passages 31 and 32, and thus with the inlet and outlet fittings 21 and 22. Due to the snug sliding fit between the valve gate and the sealing faces 26 and 30 all portions of the interior of the valve housing will be protected against the entry of large particles of foreign material thereinto, and in addition, the sealing rings, which are completely withdrawn from the flow passages are protected against abrasive action.

Now, as closing of the valve is commenced and the valve gate moves downwardly between the cam plates 33 and 40, the shoulders 53 slide downwardly over the shoulders 39 and 44', and the lower lugs 61 of the sealing rings move first into the flow path of the fluids passing through the valve. Due, however, to the relatively small expanse of the lugs 61 and the secure locking of the sealing rings to the valve gate by the engagement of the ribs 63 in the grooves 70, there will be no tendency to extrude or distort the sealing rings out of position or to tear them from the valve gate due to the flow of fluids through the valve regardless of how high the velocity of flow may be. Since the exposed faces of the valve core 56 are larger in diameter than the diameters of the passages 31 and 32, it is noted that only approximately the lower third of the sealing rings is ever exposed to the passages 31 and 32 and that this occurs only momentarily during opening and closing operations of the valve. Thus, at most, the sealing rings are subjected for only a very short period not to an abrading or wire drawing action, but merely to impact of fluids, and possibly foreign materials, directly on the faces of the rings. Such impact is, of course, the least likely to cause physical damage to the sealing rings.

As downward movement of the valve gate continues, the portion thereof directly between the passage 54 and the lower shoulder 51 moves between the lower portions of the sealing faces 26 and 30, thereby limiting and directing abrading and wire drawing action to this portion of the valve gate. Again, due to the close sliding fit between the gate and the sealing faces all flow of any appreciable velocity will be terminated before the lower portions of the sealing rings move into position between the lower portions of the sealing faces 26 and 30. Now, as the valve has moved downwardly into closed position, the flexing elements 64 will have been moved downwardly with the valve gate and brought into engagement with the wedge surfaces 38 and 44 of the cam plates. Such engagement will tend to force the flexing elements inwardly against the sealing rings, and due to the semi-circular engagement between the flexing or moving elements and the sealing rings and the direct lateral and horizontal thrust applied to the flexing elements, a uniform and radially inwardly-directed flexing or moving force will be applied to the sealing rings, the engagement of the wedge faces 70 and 71 with the inclined surfaces 60' and 61' of the lugs 60 and 61 subjecting even the lugs to a radial inward force so that substantially the entire circumference of the sealing rings is brought under a radial inward thrust. It is to be noted, however, as will clearly appear from an examination of FIG. 1, that such inward thrust does not commence until the valve core 56 has completely entered into the passages 31 and 32 and the sealing rings have been completely withdrawn from exposure to such passages. The application of radial inward thrust to the sealing rings forces the rings against the beveled surfaces 57 of the core 56, thus urging the sealing rings against the sealing faces 26 and 30, involving some small deflection or movement of the sealing rings but avoiding all necessity for cold flow thereof. In this manner, a very thorough and effective seal is obtained against pressure applied from either the inlet or the outlet of the valve, the valve core 56 cooperating with the sealing faces 26 and 30 to provide a primary metal-to-metal closure, while the sealing rings are flexed or moved against the sealing faces to provide a secondary and completely pressure-tight seal. The sealing rings are completely confined and are not required to undergo cold flow or even moderate distortion in carrying out their sealing function, and this, coupled with the mechanical advantage afforded by the wedge surfaces 67 and 38, allows the application of very great forces to the sealing ring so as to provide complete valve closure under even the most difficult conditions.

It is to be noted that some wearing of the sealing rings may occur after prolonged use and repeated opening and closing of the valve, and provision is made for accommodating such wear as illustrated in FIG. 3. Thus, as the sealing rings begin to lose thickness, the valve gate may be moved further downwardly between the cam plates, thus forcing the flexing elements 64 further inwardly and properly moving the sealing rings of reduced thickness into effective sealing engagement. Such additional downward movement of the gate may continue until the valve reaches a condition wherein the upper portions of the sealing rings are very nearly exposed to the flow passages 31 and 32, as shown in FIG. 3, after which the valve may be disassembled and new sealing rings inserted therein. The indication of such limits of wear may be afforded by any of the conventional means, such as suitable indicia upon the valve wheel 78 indicating the lower limits of travel of the valve gate.

Although the relative movement between the sealing rings 58, the beveled ends 57 of the core 56, the valve gate and the seat rings is very small, there is a small, but usually slow, inward movement of the flexing elements on the valve gate causing the outward flexing of the sealing rings, and a slight downward movement of the entire gate assembly. Of course, reverse movement takes place as the valve is opened.

The opening operation of the valve is the reverse of the closing operation, the upward movement of the valve gate withdrawing the flexing elements 64 from the wedge surfaces 38 and 44 and removing the flexing force from the sealing rings, whereby the valve gate is readily raised to an open position without undue wear on the sealing rings. Again, the sealing rings are protected completely against extrusion into the flow passage of the valve and at all times entry of large particles of foreign material into the interior of the valve housing is eliminated.

The movement of the various elements of the valve structure as the valve is opened may be described as involving an upward movement of the valve gate which removes the peripheral thrust on the sealing rings and commences withdrawal of the flexing elements from the wedge faces 38 and 44. Since the sealing rings have not been permanently flexed and since they will tend inherently to return to their unflexed position and move outwardly they will withdraw from the seating rings, thus forcing the flexing elements outwardly toward the wedge faces. In this manner, no means for positive withdrawal of the wedge elements is necessary.

The sealing rings 58 may be formed of any suitable or desirable material such as various ones of the elastomers, various of the synthetic resins and other deflectable or distortable materials. Tetrafluoroethylene polymer, known commercially as Teflon, has been found to be a most suitable material in that it is very abrasion resistant and is stable over a wide temperature range without change of dimension or strength. It is also resistant to most liquids and gases. Regardless of the material or construction of the sealing rings, they may, however, be modified as shown in FIG. 10 by incorporating therein an annular, internal reinforcing element 83 completely embedded in the ring and serving to strengthen the ring against excessive deflection. Other modifications of the sealing ring may obviously be carried out.

This valve is very readily assembled and disassembled both in manufacture and in shop or field repair in that the bonnet may be removed and the entire gate assembly readily withdrawn along with the valve stem. The cam plates 33 and 40 may then be slipped inwardly one at a time from engagement with the inner ends of the sealing rings 23 and 27 and withdrawn through the open upper end of the valve housing. Thus, new sealing rings may be installed, the gate assembly replaced or repaired as required, and the cam plates replaced or repaired. The spacing of the flanges 24 and 28 permit the sealing rings 23 and 27 to be pried or jacked one at a time from the counterbores 15 and 18 and repaired or replaced, the sealing rings being re-installed by insertion into the counter bores and the utilization of conventional hydraulic jacking means which may be inserted into the valve housing between the sealing rings for pressing or forcing them into their properly seated position. Thereafter, the remaining elements may simply be inserted and re-installed as described above.

The unique arrangement of the flexing elements 64 and their coaction with the sealing rings 58 not only securely retain the sealing rings in position, but permit the equal and simultaneous application of a radially inwardly-directed deflecting force around substantially the entire periphery of the sealing rings. This peripheral application of a radial force is made even more complete through utilization of the beveled faces 70 and 71 of the flexing elements and the beveled faces 60' and 61' of the sealing rings. The beveled exposed portions 57 of the valve core 56 also aid in minimizing if not eliminating any requirement that the sealing rings undergo even the slightest degree of cold flow in that the inclined or angular engagement between the sealing rings and the valve core urge the sealing rings outwardly into sealing position when force is applied thereto. At the same time, however, the sealing rings are held securely against possible dislodgement.

Throughout this disclosure, the terms "flexing," "deflection" and "movement" have been used as substantial synonyms as contrasted to "cold-flowings" or "distortion." The movement of the sealing ring is very slight and is viewed as an outward bowing or flexing rather than an internal flow or even circumferential flow.

The foregoing description of the invention is explanatory thereof and various changes in the size, shape and materials, as well as in the details of construction may be made, within the scope of the appended claims, without departing from the spirit of the invention.

What I claim and desire to secure by Letters Patent is:

1. A gate valve including, a valve body having an inlet port and an outlet port, at least one of the ports terminating in a valve face in the valve body, a valve core slidably positioned in the valve body for movement with respect to the valve face, a sealing ring encompassing and carried by the valve core, the sealing ring engaging the valve face when the valve is in closed position, at least a pair of ring flexing elements engaging and surrounding the outer periphery of the sealing ring and having wedge faces, and wedge means in the valve body for engaging the wedge faces and moving the sealing ring into sealing engagement with the valve face as the valve core is moved into closing position between the ports.

2. A gate valve as set forth in claim 1, and an interlocking rib and groove joint between the sealing ring and the ring flexing elements.

3. A gate valve as set forth in claim 1, wherein the sealing ring is recessed into the ring flexing elements.

4. A gate valve as set forth in claim 1, wherein the pair of ring flexing elements is spaced apart and formed with opposed secondary wedge surfaces, having a space therebetween, the sealing ring being formed with complementary wedge surfaces bridging the space between the secondary wedge surfaces.

5. A gate valve including, a valve body having an inlet port and an outlet port, the ports terminating in spaced opposed valve faces in the valve body, a valve core slidably positioned in the valve body between the opposed valve faces, sealing rings substantially surrounding the valve core, one sealing ring adjoining each of the valve faces when the valve is in closed position, at least a pair of ring flexing elements engaging each sealing ring and having wedge faces, and wedge means in the valve body for engaging the wedge faces and moving the sealing rings into sealing engagement with the valve faces as the valve core is moved into closing position between the ports.

6. A gate valve including, a valve body having an inlet port and an outlet port, the ports terminating in spaced opposed valve faces in the valve body, a pair of guide plates removably positioned in the valve body and surrounding the valve faces, a valve gate slidably positioned in the valve body between the opposed valve faces and reciprocable between the guide plates, a valve core carried by the valve gate having sliding engagement with the valve faces, sealing rings carried by the valve core, at least a pair of ring flexing elements engaging each sealing ring and having wedge faces, and wedge means carried by the guide plates for engaging the wedge faces and moving the sealing rings into engagement with the valve faces as the valve core is moved into closing position between the ports.

7. A gate valve as set forth in claim 6 wherein the sealing rings have substantially circular outer peripheries and the ring flexing elements have arcuate inner margins engaging substantially the entire peripheries of the sealing rings.

8. A gate valve as set forth in claim 6 wherein the valve gate is formed with projecting shoulders above and below the valve core, and the sealing ring and flexing elements are confined between the shoulders against movement parallel to the path of movement of the valve gate.

9. A gate valve including, a valve body having an inlet port and an outlet port, at least one port terminating in a valve face in the valve body, guide means in the valve body, a valve gate slidably positioned in the valve body in the guide means, a valve core carried by the valve gate for movement with respect to the valve face, a sealing ring carried by the valve core, at least a pair of ring flexing elements engaging and surrounding the outer periphery of the sealing ring and having wedge faces, and wedge means in the valve body for engaging the wedge faces and moving the sealing ring into engagement with the valve face as the valve core is moved into closing position between the ports.

10. A gate valve as set forth in claim 9 wherein the flexing elements are carried by the valve gate.

11. A gate valve as set forth in claim 9 wherein the valve core projects from the valve gate toward the valve face, the projecting portion of the valve core being tapered toward the valve face and the inner margin of the sealing ring engages the projecting portion of the valve core and is complementarily tapered.

12. A gate valve including, a valve body having an inlet port and an outlet port, at least one tubular member projecting into the valve body from at least one of the ports and terminating in a valve face within the valve body, a guide plate supported within the body on the tubular member, a valve gate slidably positioned in the body in the guide plate, a valve core carried by the valve gate having sliding engagement with the valve face, a sealing ring surrounding the valve core for engaging the valve face when the valve is in closed position, at least a pair of ring flexing elements engaging the sealing ring and having wedge faces, and wedge means on the guide plate for engaging the wedge faces and flexing the sealing ring into engagement with the valve face as the valve core is moved into closing position between the ports.

13. A gate valve including, a valve body having an inlet port and an outlet port, at least one tubular member projecting into the valve body from at least one of the ports and terminating in a valve face within the valve body, a guide plate supported within the body on the tubular member, the guide plate having a guide face co-planar with the valve face and guide shoulders projecting from said guide face, wedge elements projecting from the guide face a distance less than the guide shoulders and having inclined faces extending in a plane parallel to the plane of the guide face, a valve gate slidably positioned in the valve body in the guide plate between the guide shoulders, upper and lower offset portions projecting from the valve gate toward the guide face, a valve core projecting from the portion of the valve gate between the upper and lower offset portions toward the guide face and being spaced from the upper and lower offset portions, a sealing ring surrounding the valve core and having portions abutting the offset portions so as to be held thereby against movement on the valve gate parallel to the direction of movement of the valve gate, at least a pair of ring flexing elements engaging the sealing ring and the upper and lower offset portions, and wedge faces on the flexing elements alined with the inclined faces of the wedge elements for flexing the sealing ring into sealing engagement with the valve face when the valve core is moved into closing position between the ports, the valve core, sealing ring, flexing elements and upper and lower offset portions each exposing a face co-planar with one another and substantially co-planar with the valve face and the guide face.

14. A gate valve as set forth in claim 13 wherein the core and sealing ring are circular and the flexing elements engage the entire periphery of the sealing ring with the exception of the portions of the sealing ring abutting the offset portions, the abutting portions of the sealing ring being diametrically opposed and projecting from the sealing ring with convergent side walls, the flexing elements having inclined surfaces complementary to and abutting the convergent side walls of the projecting abutting portions of the sealing ring for applying a force radially inward of the sealing ring in the area of said projecting abutting portions.

References Cited in the file of this patent

UNITED STATES PATENTS 2,911,188 Anderson _____ Nov. 3, 1959

FOREIGN PATENTS 4,154 Switzerland _____ Oct. 17, 1891